March 10, 1953 W. KALS 2,631,018
CONCENTRATING APPARATUS
Filed April 3, 1948
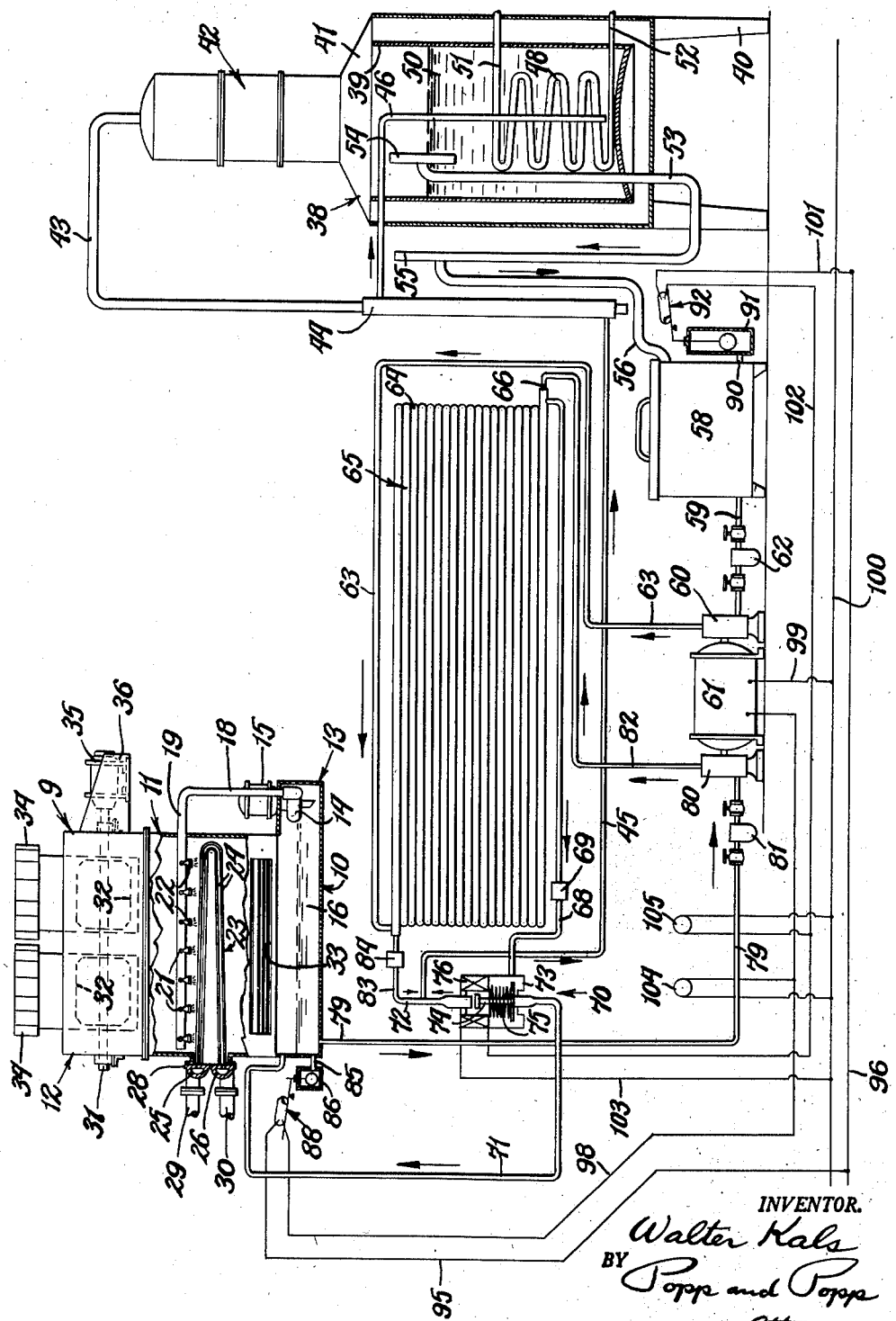
INVENTOR.
Walter Kals
BY Popp and Popp
Attorneys.

UNITED STATES PATENT OFFICE 2,631,018

CONCENTRATING APPARATUS

Walter Kals, New York, N. Y., assignor to Niagara Blower Company, New York, N. Y., a corporation of New York Application April 3, 1948, Serial No. 18,764

8 Claims. (Cl. 261—3)

This invention relates to concentrating apparatus and more particularly to such apparatus for maintaining the concentration of refrigerated spray liquid consisting of water mixed with a higher boiling point antifreeze component, which spray liquid is used to cool and dehumidify the air in an enclosure.

This application is directed to an improvement upon the apparatus shown in the Olstad Patent 2,352,655 granted July 4, 1944.

In the concentrating apparatus shown in this Olstad patent, the dehumidification of the air being handled by the spray cooler results in dilution and a rise in level of the spray liquid in a sump in the bottom of the spray cooler. This rising level actuates a float valve to admit a part of the dilute spray liquid being recirculated by the spray pump of the spray cooler to a concentrating tank where heat is applied to evaporate the excess water and restore its strength in the high boiling point antifreeze component. This dilute liquid is admitted to the top of the concentrating tank remote from the immediate zone of action of the heating surfaces submerged in the bottom of the spray liquid being evaporated in the concentrating tank and the concentrated spray liquid overflows through an overflow pipe and returns to the spray cooler sump. In so returning to the spray cooler sump the hot, concentrated spray liquid is passed in heat exchange relation to the cold dilute spray liquid being fed to the concentrating tank, the hot concentrated spray liquid preheating the cold dilute spray liquid entering the concentrating tank, and the cold, dilute spray liquid precooling the hot concentrated spray liquid returning to the spray cooler.

Concentrating apparatus constructed and operating as above has a number of serious disadvantages, particularly where the spray cooler is being operated under a heavy dehumidifying load and under low temperature and where exact control of the leaving air temperature is desired.

Thus, with such concentrating apparatus, the counter-current flow through the heat exchanger of hot concentrated and cold dilute liquid is not always simultaneous. This is due to the fact that on cut off of the feed of dilute spray liquid to the concentrating tank the heater therein continues to evaporate the spray liquid in the concentrating tank until a concentration is reached whose boiling point corresponds to the temperature of the heating surface. When this condition is reached the level of the spray liquid in the concentrating tank is several inches below the overflow pipe. As a result a substantial amount of cold dilute feed spray liquid must be admitted to the concentrating tank before the level therein builds up sufficiently high to overflow into the overflow pipe and return concentrated spray liquid to the spray cooler. Conversely, hot liquid will continue overflowing from the concentrator tank even after the feed supply of cold dilute liquid has ceased, until the level in the concentrating tank has dropped below the opening of the overflow pipe. The elevation of the level in the concentrating tank above the overflow point occurs during the state of simultaneous feed and return to establish the necessary static head for propelling the concentrated return liquid through the heat exchanger at the required rate of flow. In consequence the input and output of the concentrating tank are at times out of phase, and the heat exchange relation between hot concentrated and cold dilute liquid is then severed.

Also the size of the heat exchanger between the cold incoming and hot outgoing spray liquid of the concentrating tank is very seriously limited. The concentrated return spray liquid necessarily flows through this heat exchanger by gravity and hence its resistance to the gravity flow of this return spray water limits the amount of heat exchange surface which can be incorporated in the heat exchanger. To remedy this condition by elevating the concentrating tank considerably above the heat exchanger would seriously limit the possibility of proper installation. As a result, the capacity of the heat exchanger is insufficient particularly so, if at low temperatures the transfer of heat is impaired by a high viscosity of the cold feed liquid, and the concentrated spray liquid is returned to the spray cooler at such high temperature as to impose an uneconomical added refrigeration load.

Also the periodic return of hot spray liquid to the spray cooler will cause corresponding fluctuations of the leaving temperature of the air to be cooled, making it impossible to achieve exact control for uniform performance. Under a heavy dehumidifying load the return of hot concentrated liquid to the spray cooler will occur more frequently and the undesirable results will be more prevalent.

Also the gravity return imposes undesirable limitations on the arrangement of the apparatus. Thus, with a gravity return from the concentrating tank to the spray cooler it is necessary, of course, to place the concentrating tank above the level of the spray cooler. In addition, this gravity return restricts the distance that the concentrating tank can be spaced from the spray cooler. These limitations in the spacing requirements of the spray cooler and the concentrating tank frequently are a serious handicap in proper installation of the equipment.

It is accordingly one of the objects of the invention to provide such concentrating apparatus in which the flow of cold dilute spray liquid and hot concentrated spray liquid through the heat exchanger are always simultaneous.

Another object is to provide such concentrating apparatus in which the concentrated spray liquid can be returned to the spray cooler at any suitable cycle, but only while cold dilute spray liquid is leaving the spray cooler in an opposite direction.

Another object is to provide such concentrating apparatus in which the heat exchanger between the cold dilute and hot concentrated spray liquid can be of any size and have any amount of surface to achieve highest heat exchange efficiency.

Another object is to provide such concentrating apparatus in which the feed of cold dilute spray liquid is arranged to secure maximum efficiency in bringing this cold dilute spray liquid up to boiling temperature.

Another aim is to provide such a concentrating apparatus in which the concentrating tank can be placed below or above the spray cooler and in which these components can be placed as far apart as may reasonably be desired.

Another object is to provide such concentrating apparatus in which the heat exchanger between the cold dilute and hot concentrated spray liquid may be placed as remote from the concentrating tank as may be reasonably desired thereby to render both the concentrating tank and the heat exchanger readily accessible for cleaning and repairs.

Another object is to provide such concentrating apparatus in which the spray liquid is thoroughly filtered, this being accomplished by filtering both the feed and the return spray liquid.

Other objects and advantages of the invention will be apparent from the following description and drawing in which the figure is a diagrammatic representation of a spray cooler served by concentrating apparatus embodying the present invention.

The spray cooler in connection with which the concentrating apparatus forming the subject of the present invention is employed is designated generally at 9 and is shown as having a rectangular, box-like casing composed of three sections 10, 11 and 12, the base section 10 forming a sump or tank for collecting the recirculated spray water, the intermediate section 11 housing the cooling coils and sprays, and the upper section 12 housing the discharge fans. The base section 10 is extended at one end of the casing beyond the other sections 11 and 12 to form an enclosed base extension 13 at this end of the spray cooler. In this enclosed base extension 13 is housed a spray water pump 14 driven by an electric motor 15 mounted on the top wall of this enclosed base extension 13 and withdrawing spray water from the body 16 thereof contained in the base section 10 of the casing and discharging it into a spray water pipe 18 which extends upwardly therefrom and connects with a horizontal spray pipe 19 which latter extends through the upper part of the adjacent end wall of the intermediate casing section 11 to the opposite end thereof. This opposite end of the horizontal spray pipe 19 is closed and within the casing section 11 this horizontal spray pipe carries a plurality of branches 21 each carrying a nozzle 22 from which a spray of the spray liquid is discharged into the air stream flowing upwardly through the casing and also against a cooling surface or coil 23.

This cooling coil is shown as composed of a plurality of smooth surfaced hairpin tubes 24 having upper and lower legs, the upper legs being connected to an inlet header 25 and the lower legs being connected to an outlet header 26. These headers are shown as connected by a single integral tube sheet 28 suitably secured against an opening provided in an end wall of the intermediate casing section 11 so that the hairpin tubes and the headers are insertable as a unit into and out of the intermediate casing section 11. The inlet header 25 is provided with an inlet 29 and the outlet header 26 is provided with an outlet 30.

In the end walls of the upper section 12 is journaled a fan shaft 31 which is shown as carrying two fan rotors 32 which draw up air through a louvered inlet opening 33 in the intermediate casing section 11 and discharge it through outlets 34, these outlets being preferably directed to discharge the air horizontally. The fan shaft 31 is driven by a motor 35 which is suitably supported by a bracket 36.

Any suitable cooling medium can be employed, but where low temperatures are desired ammonia or other gaseous refrigerant can be direct expanded in the hairpin tubes 24, the refrigerant being supplied through the inlet 29 and the expanded gas being removed from the outlet 30 of the cooling coil 23.

High heat transfer efficiency is obtained in the above apparatus by the use of water containing an antifreeze component, such as a higher alcohol, as the spray liquid recirculated from the body 16 of this liquid in the bottom section 10 of the casing through the spray nozzles 21 by the spray water pump 14. The sprays from these spray nozzles impinge against the hairpin tubes 24 which form an expansion coil for the direct expanded refrigerant and form rapidly replaced thin films of liquid thereon which provide constant heat transfer characteristics of high efficiency, the air drawn upwardly through the casing by the fan wheels 32 being cooled to approximately the temperature of the hairpin tubes 24 both through contact with the films of liquid on these tubes and also through contact with the free spray liquid which is brought to approximately the same temperature as the hairpin tubes by repeated contact therewith.

When the temperatures of the refrigerating medium used in the hairpin tubes 24 is below the dewpoint of the air drawn in through the louvered inlet 33, this air is chilled below its dewpoint by contact with the spray liquid and consequently water is precipitated from the air and mixes with the spray liquid collecting in the bottom section 10 of the casing. It is apparent that this excess water added to the spray liquid must be discharged and if discharged by means of a simple overflow with a waste pipe a large amount of the antifreeze medium will be lost. Moreover, where the excess water caused by this dilution is merely discharged it is, of course, necessary that the attendant keep track of the degree of concentration of the solution since otherwise freezing of the spray liquid on the hairpin tubes 24 is apt to occur. Further, the higher alcohols which I prefer to employ are considerably more expensive than the salt usually employed in brine spray coolers and it would be highly uneconomical to waste the diluted antifreeze spray liquid or solution.

To avoid these difficulties the present invention provides an automatic system for withdrawing the spray liquid from the bottom section 10 of the spray cooler when the dilution reaches a predetermined point, delivering the withdrawn liquid to a concentrator where heat is applied to reconcentrate the solution and returning the concentrated solution to the spray cooler for reuse.

This concentrator, indicated generally at 38, is shown as comprising a concentrating tank 39 which is provided with a suitable thermal insulating jacket and is shown as supported on legs 40. The top 41 of the concentrating tank is shown as being of conical form and as supporting a bubble column 42 through which the vapor generated in the concentrating tank 39 pass. This bubble column 42 acts in the manner of a fractionating tower to fractionally distil the vapor generated in the concentrating tank 39 so as to recover the higher boiling point fraction or higher alcohol vaporized in the concentrating tank 39 and return this higher boiling point fraction to the concentrating tank. This bubble column forms no part of the present invention and can be of any suitable construction such as that shown in the said Olstad Patent No. 2,352,655.

The vapors from the bubble column 42 escape through a vapor outlet pipe 43 connecting with the top of the bubble column and extending downwardly alongside the concentrating tank 39, these vapors discharging to the atmosphere or into a drain. To conserve heat, this vertical vapor outlet pipe 43 from the bubble column is surrounded by a jacket pipe 44 which is closed at its opposite ends so as to form a heat exchanger. The dilute spray liquid to be concentrated is delivered to the lower end of this jacket from a line 45, this dilute spray liquid being further preheated in this jacket before entering the concentrating tank through heat derived from vapors from the bubble column 42. The dilute spray liquid so preheated in a final stage in the jacket 44 leaves from the upper end thereof through a pipe 46 which extends through the side wall of the concentrating tank 39 near the upper end thereof and extending thence downwardly to a point adjacent the bottom of the concentrating tank where it discharges the dilute spray liquid to be concentrated into the concentrating tank. This form of the dilute spray liquid inlet pipe 46 to the concentrating tank 39 is an important feature of the invention since it is desirable to admit the dilute spray liquid to the concentrating tank above the level of the liquid therein and by extending this inlet pipe 46 downwardly to the bottom of the tank the dilute spray liquid is delivered directly into the immediate zone of action of the steam heating coil 48, this steam heating coil being located in the lower part of the body 50 of spray liquid contained in the concentrating tank 39 and the delivery of the cold incoming dilute spray liquid into the immediate zone of action of this heating coil serving to bring the temperature of the dilute incoming spray liquid rapidly up to its boiling point. The steam inlet 51 and condensate outlet 52 for this steam coil 48 extend through the side wall of the concentrating tank 39.

The concentrated spray liquid in the concentrating tank 39 overflows into the upper bend of an overflow pipe 53, this upper bend connecting with the central part of a vertical equalizing pipe 54 which is open at its upper and lower ends. This overflow pipe 53 extends downwardly through the bottom of the concentrating tank 39 and connects with a standpipe 55, the upper open end of which extends a substantial distance above the level of the body 50 of spray water in the tank as determined by the bend at the upper end of the overflow pipe 53. At a point slightly below this level of the body 50 of spray liquid in the concentrating tank the standpipe 55 connects with a concentrated spray liquid return pipe 56.

This spray liquid return pipe 56 delivers the concentrated spray liquid by gravity into a strong liquor receiver 58 which has its outlet line 59 connected with the inlet of a return pump 60 driven by an electric motor 61, this outlet line 59 containing a filter strainer 62 and being suitably valved as shown. The discharge line 63 from the return pump connects with the outer tube 64 of a concentric tube heat exchanger 65, this outer tube surrounding the inner serpentine tube 66 concentrically and being closed at its opposite ends. The opposite end of this outer tube 64 connects with a line 68 containing a check valve 69 and connecting with the common inlet port of a three-way solenoid valve 70.

This three-way solenoid valve 70 can be of any suitable form to deliver, when energized, the concentrated spray liquid from the line 68 through the normally closed outlet port of said solenoid valve to a return line 71 discharging the concentrated spray liquid in the body of spray liquid 16 contained in the base tank or sump 10 of the spray cooler and to deliver, when deenergized, the concentrated spray liquid from the line 68 through the normally open outlet port of said solenoid valve to a pipe 72. For this purpose the solenoid valve 70 is shown as comprising an enclosed valve body 73 having a valve seat at one end around the normally closed port connected with the return line 71 and having a valve seat at its opposite end around the normally open port connected with the pipe 72. A movable core 74 is arranged in this valve body and provided with plugs at its opposite ends adapted to seat alternately against these seats at the opposite ends of the valve body. A helical compressed spring 75 biases this movable core to normally seat against the seat surrounding the normally closed port leading to the return line 71. This movable core is moved against the resistance of the spring 75 and into seating relation with the seat surrounding the normally open port leading to the pipe 72 by the energization of the winding 76 of the solenoid valve.

The diluted spray liquid from the spray cooler is relieved through a line 79 connected with the base tank or sump 10 of the spray cooler so as to withdraw the dilute spray liquid from the body 16 of spray liquid therein. This line 79 connects with the inlet of a feed pump 80 which is also driven by the electric motor 61 and contains a filter strainer 81 and is suitably valved. It will be noted that both the feed pump 80 and the return pump 60 are driven by the same motor so as to be simultaneously operated and simultaneously rendered inoperative. The discharge line 82 from the feed pump 80 connects with that end of the serpentined inner tube 66 of the concentric tube heat exchanger 65 adjacent the leaving concentrated spray liquid flowing through the outer tube 64 so that the flow of cold, dilute and warm, concentrated spray liquid through this concentric tube heat exchanger is countercurrent. The opposite end of the inner tube 66 of the concentric tube heat exchanger 65 connects with a pipe 83 containing a check valve 84. This pipe 83 connects with the pipe 72 from the solenoid valve 70 and when the solenoid valve 70 is deenergized, the co-mingled streams of concentrated and dilute spray liquid from the pipes 72 and 83, respectively, escape into the line 45 which delivers the co-mingled spray liquid to the concentrator 38 as previously described.

The withdrawal of dilute spray liquid from the base tank or sump 10 of the spray cooler and the return of concentrated spray liquid thereto is rendered responsive to both the level of the dilute spray liquid 16 in the base tank or sump 10 of the cooler and the level of the concentrated spray liquid in the strong liquor receiver 58. For this purpose a pipe 85 leads from the base tank or sump 10 of the spray cooler to the bowl 86 of a float switch 88, the pipe 85 maintaining the same level in the bowl 86 as the level of the body 16 of spray liquid in the sump or tank 10. The moving arm of this float switch 88 is shown as carrying a mercury switch in the form of a dielectric capsule containing a globule of mercury which rolls to close a pair of contacts at one end of the capsule when the body 16 of spray liquid rises above a predetermined level. Similarly a pipe 90 leads from the bottom of the strong liquor receiver 58 to the bowl 91 of a float switch 92, the pipe 90 maintaining the same level in the bowl 91 as the level of the concentrated spray water in the strong liquor receiver 58. The moving arm of this float switch 92 is shown as carrying a mercury switch in the form of a dielectric capsule containing a globule of mercury which rolls to close a pair of contacts at one end of the capsule when the concentrated spray water in the strong liquor receiver rises above a predetermined level.

The float switch 88 of the spray cooler 9 has one contact connected by a line 95 with one side 96 of the main power line. The other contact of this float switch 88 is connected by a line 98 with one terminal of the electric motor 61. The other terminal of this electric motor is connected by a line 99 with the other side 100 of the main power line. The float switch 92 of the strong liquor receiver 58 has one contact connected by a line 101 with the side 96 of the main power line. The other contact of this float switch 92 is connected by a line 102 with the winding 76 of the three-way solenoid valve 70. The other end of the winding 76 of the solenoid valve 70 is connected by a line 103 with the side 100 of the main power line.

For convenience in observing the condition of operation of the concentrating apparatus, a feed indicator light 104 is preferably connected across the lines 98 and 100 and a return indicator light 105 is preferably connected across the lines 102 and 100.

Operation

In charging the apparatus at the start of operation, the base tank or sump 10 of the spray cooler is preferably filled with a mixture of water and higher alcohol or other antifreeze medium of normal operating concentration and slightly below the level of the cut in point of the float switch 88. The strong liquor receiver 58 is similarly charged with spray liquid to a level slightly below the cut in point of its float switch 92 but the strong liquor receiver is preferably charged with a strong solution, that is, spray liquid having a substantially higher concentration of the antifreeze component than that with which the spray cooler 9 is charged. The concentrating tank 39 is preferably charged with a strong solution having substantially the same concentration as that with which the strong liquor receiver 58 is charged, but this concentrating tank is filled up to the level of its overflow pipe 53.

Steam is supplied to the heating coil 48 through its inlet 51. With the steam on and no feed to the concentrating tank 39 the level of the body 50 of solution in the concentrating tank boils slightly below the overflow pipe 53, the concentration of this body of liquid ceasing when the boiling point of the solution equals the steam temperature of the heating coil 48.

After being so charged and the concentrating tank 39 placed in operation, the spray cooler 9 is placed in operation, the motor 35 being started to drive the fan wheels 32 and draw air in through the inlet 33, up the interior of the spray cooler casing and out through the outlets 34, the motor 15 being started to drive the spray pump 14 and thereby draw the spray liquid from the body 16 in the base tank or sump 10 and discharge it from the spray nozzles 21 into the air stream so flowing upwardly through the spray cooler casing and against the cooling coils 23 thereof. These cooling coils are supplied with a refrigerant, such as ammonia or Freon, which expands within these coils to provide the desired low temperature to which the stream of air is to be cooled.

This temperature of the cooling coils 23, and which is also imparted to the spray water, is assumed to be below the dewpoint of the entering air and hence moisture is condensed out of the air stream, the condensate joining and diluting the spray liquid. This addition of water abstracted from the passing air raises the level of the body 16 in the base tank or sump 10 to a point where the float switch 88 closes the circuit from the side 96 of the main power line, float switch 88, line 98 and motor 61 to the other side 100 of the main power line. The motor 61 so energized drives both the feed pump 80 and the return pump 60.

The feed pump 80 draws the diluted spray liquid in the base tank or sump 10 of the spray cooler through the line 79 and its filter strainer 81 and forces it through the feed pump discharge line 82, inner tube 66 of the concentric tube heat exchanger 65, check valve 84, lines 83 and 45, jacket 44 of the vapor heat exchanger and through pipe 46 to the bottom of the concentrating tank 39. Escape of liquid through the now deenergized three-way valve 70 and line 68 is prevented by the check valve 69. Since this pipe 46 extends to the bottom of the concentrating tank, this dilute spray liquid is admitted directly to the immediate zone of action of the steam coils 48 so that this incoming dilute feed liquid is rapidly brought up to boiling temperature. The waste vapors generated by this boiling liquid escape through the bubble column or fractionating tower 42 to the vapor line 43 where, in escaping to waste, they pass through the jacket 44 and hence serve to preheat in a final stage the incoming dilute spray liquid.

At the same time that the feed pump 80 starts to move the dilute feed spray liquid to the concentrating tank 39, the return pump 60 withdraws the concentrated spray liquid from the strong liquor receiver 58 through the pipe 59 and filter strainer 62 and discharges this concentrated spray liquid through the line 63, the outer tube 64 of the concentric tube heat exchanger 65, line 68, check valve 69, common inlet port of three-way solenoid valve 70 and normally open outlet port of said solenoid valve into the pipe 72 to join the stream of dilute spray liquid flowing from the pipe 83, check valve 84 and inner tube 66 of concentric tube heat exchanger 65 as just described.

With this feed of spray liquid to the concentrating tank 39 by both the feed pump 80 and the return pump 60, it is apparent that the body of liquid 50 in the concentrating tank 39 will soon start to overflow into the overflow pipe 53. This overflow passes by gravity from the overflow pipe 53 through the standpipe 55 and line 56 into the strong liquor receiver 58. It will particularly be noted that this expedited overflow of the body 50 of spray liquid in the concentrating tank 39 is provided by the fact that both the feed and return pumps 80 and 60 are operated simultaneously to discharge spray liquid into the concentrating tank 39, the one withdrawing dilute spray liquid from the spray cooler 9 and the other withdrawing concentrated spray liquid from the strong liquor receiver 58.

This joint discharge of both the feed and return pumps 80 and 60 into the concentrating tank 39, results in a prompt overflow from the overflow pipe 53 to the strong liquor receiver 58 without notably unbalancing the concentrations. The heating coil 48 vaporizes the excess quantity of water introduced by the feed pump at a predetermined rate in the form of dilute liquid. The corresponding yield of concentrate builds up the level of the spray liquid in the strong liquor receiver. When this level in the strong liquor receiver 58 builds up to a point to close the float switch 92, this float switch closes a circuit from the side 96 of the main power line, line 101, closed float switch 92, line 102, winding 76 of the three-way solenoid valve 70 and line 103 to the other side 100 of the main power line. This energization of the three-way solenoid valve 70 draws its core 74 to close the normally open outlet port leading to the pipe 72 and to open its normally closed outlet port leading to the return pipe 71. Hence the discharge of the concentrated spray liquid from the return pump 60, instead of being added to the dilute spray liquid moved to the concentrating tank 39 by the feed pump 80, is now returned to the base tank or sump 10 of the spray cooler to build up both the level and also the concentration of the body 16 of the spray liquid therein.

This condition represents the normal operative condition of the concentrating apparatus and it will be seen that in this operation the feed pump 80 simultaneously moves the cold dilute spray liquid through the concentric tube heat exchanger 65 in countercurrent relation to the movement of the hot concentrated spray liquid by the return pump 60. It will further be seen that by the provision of both the feed pump and the return pump the concentric tube heat exchanger 65 can be of any desired size in point of amount of heat transfer surface so that full heat transfer efficiency between the cold dilute spray liquid and the hot concentrated return spray liquid can be obtained. This feature is most important where the spray cooler is operated at low temperature and under high dehumidification loads as the return of excessively hot return spray liquid to the spray cooler imposes a direct load on the refrigeration with which this spray cooler is supplied, and also may cause fluctuation of the outlet temperature of the air to be cooled.

When a sufficiently low level of the body of concentrated spray liquid in the strong liquor receiver 58 is reached, the float switch 92, of course, cuts out so as to deenergize the solenoid valve 70 and cut off the return of concentrated spray liquid from the strong liquor receiver 58 to the sump 10 of the spray cooler 9. The amount of spray liquid returned to the spray cooler 9 by the return pump 60 from the strong liquor receiver 58 at each cycle of operation is determined by the rate of delivery of the return pump 60 and liquid volume corresponding to the level differential in the strong liquor receiver 58 which is required to operate the float switch 92. These factors are so selected that the quantity of spray liquid returned by the return pump 60 to the spray cooler 9 at each cycle of operation is less than the quantity of spray liquid being simultaneously pumped out of the base tank or sump 10 of the spray cooler by the feed pump 80 and fed to the concentrating tank 39. Consequently a low level will always be reached in the base tank or sump 10 of the spray cooler 9 which terminates the cycle of operation by opening the float switch 88 and deenergizing the motor 61 driving the feed and return pumps 80 and 60. The level of the spray liquid in the strong liquor receiver is at this time below the cut in point of the float switch 92 since the predetermined rate of delivery of the return pump is equal or greater than the yield of concentrate during each operating cycle and hence the apparatus is returned to the original condition assumed to be again rendered operative when the level of the body 16 of spray liquid in the spray cooler again builds up to the cut in point of the float switch 88 through the accumulation of moisture condensed from the air stream drawn through the spray cooler.

From the foregoing it will be seen that the concentrating apparatus of the present invention accomplishes the various objectives and possesses the various advantages set forth in particular permitting of adjusting the cycling to that required for the most efficient operation of the apparatus, providing heat exchange surface between the spray liquid to and from the concentrating tank in sufficient amount to reduce the refrigeration losses from this source to a minimum and to avoid fluctuation of the leaving temperature of the air to be cooled and introducing the dilute solution to the concentrating tank in the most advantageous zone thereof.

I claim:

1. In concentrating apparatus for a cooler having means for discharging liquid containing an antifreeze component having a boiling point higher than water into direct contact with a gas, a tank collecting said discharged liquid and means recirculating said liquid from said tank to said discharging means, and said concentrating apparatus having a concentrator in which heat is applied to said liquid to evaporate a portion of the water therein and a heat exchanger through which the liquid flowing to and from said concentrator passes in heat exchange relation; the combination therewith of means for maintaining the concentration of said liquid in said cooler under conditions of operation where said liquid in said cooler is subject to dilution, comprising a feed pump between said cooler and said concentrator and feeding the dilute liquid from said cooler through said heat exchanger to said concentrator, a return pump between said concentrator and said cooler and returning the concentrated liquid from said concentrator through said heat exchanger, a valve at the outlet of said heat exchanger and arranged to divert said concentrated liquid to said cooler or to said concentrator, means arranged to actuate said valve during the initial operation of said feed and return pumps to divert said concentrated liquid to said concentrator and on continued operation of said feed and return pumps to divert said concentrated liquid to said cooler, and means responsive to the degree of dilution of said liquid in said cooler for substantially simultaneously rendering said feed and return pumps operative and inoperative.

2. In concentrating apparatus for a cooler having means for discharging liquid containing an antifreeze component having a boiling point higher than water into direct contact with a gas, a tank collecting said discharged liquid and means recirculating said liquid from said tank to said discharging means, and said concentrating apparatus having a concentrator in which heat is applied to said liquid to evaporate a portion of the water therein, and a heat exchanger through which the stream of liquid flowing to and the stream of liquid flowing from said concentrator passes in heat exchange relation; the combination therewith of means for positively inducing and positively arresting the countercurrent flow of both of said streams of liquid simultaneously and loading each stream with the necessary mechanical energy to be consumed during convective transmission of heat in said heat exchanger from one of said streams to the other at a sufficiently high rate, comprising a feed pump between said cooler and said concentrator and feeding the dilute liquid from said cooler through said heat exchanger to said concentrator, a return pump arranged to return the concentrated liquid from said concentrator through said heat exchanger to said cooler, and means responsive to the degree of dilution of said liquid in said cooler for substantially simultaneously rendering said feed and return pumps operative and inoperative.

3. In concentrating apparatus for a cooler having means for discharging liquid containing an antifreeze component having a boiling point higher than water, into direct contact with a gas, a tank collecting said discharged liquid and means recirculating said liquid from said tank to said discharging means, and said concentrating apparatus having a concentrator in which heat is applied to said liquid to evaporate a portion of the water therein and a heat exchanger through which the liquid flowing to and from said concentrator passes in heat exchange relation; the combination therewith of means for maintaining the concentration of said liquid in said cooler under conditions of operation where said liquid in said cooler is subject to dilution, comprising a feed pump between said cooler and said concentrator and feeding the dilute liquid from said cooler through said heat exchanger to said concentrator, a return pump between said concentrator and said cooler and returning the concentrated liquid from said concentrator through said heat exchanger to said cooler, means responsive to the degree of dilution of said liquid in said cooler for substantially simultaneously rendering said feed and return pumps operative and inoperative, a three-way valve having its common inlet connected to the concentrated liquid outlet from said heat exchanger and in one position of its parts delivering the concentrated liquid from its inlet to the dilute liquid entering said heat exchanger and in another position of its parts delivering the concentrated liquid from its inlet to said cooler, means holding said three-way valve parts in said one position during the initial operation of said feed and return pumps, and means moving said three-way valve parts to said another position during the continued operation of said feed and return pumps.

4. In concentrating apparatus for a cooler having means for discharging liquid containing an antifreeze component having a boiling point higher than water, into direct contact with a gas, a tank collecting said discharged liquid and means recirculating said liquid from said tank to said discharging means, and said concentrating apparatus having a concentrator in which heat is applied to said liquid to evaporate a portion of the water therein and a heat exchanger through which the liquid flowing to and from said concentrator passes in heat exchange relation; the combination therewith of means for maintaining the concentration of said liquid in said cooler under conditions of operation where said liquid in said cooler is subject to dilution, comprising a feed pump between said cooler and said concentrator and feeding the dilute liquid from said cooler through said heat exchanger to said concentrator, a return pump between said concentrator and said cooler and returning the concentrated liquid from said concentrator through said heat exchanger to said cooler, means responsive to the degree of dilution of said liquid in said cooler for substantially simultaneously rendering said feed and return pumps operative and inoperative, a three-way valve having its common inlet connected to the concentrated liquid outlet from said heat exchanger and in one position of its parts delivering the concentrated liquid from its inlet to the dilute liquid entering said heat exchanger and in another position of its parts delivering the concentrated liquid from its inlet to said cooler, means holding said three-way valve parts in said one position during the initial operation of said feed and return pumps, means moving said three-way valve parts to said another position during the continued operation of said feed and return pumps, and a check valve in each line through said heat exchanger and preventing reverse flow of the dilute and concentrated liquid therethrough.

5. In concentrating apparatus for a cooler having means for discharging liquid containing an antifreeze component having a boiling point higher than water into direct contact with a gas, a tank collecting said discharged liquid and means recirculating said liquid from said tank to said discharging means, and said concentrating apparatus having a concentrator in which heat is applied to said liquid to evaporate a portion of the water therein, a strong liquid receiver for the concentrated liquid from said concentrator, and a heat exchanger through which the liquid flowing to and from said concentrator passes in heat exchange relation; the combination therewith of means for maintaining the concentration of said liquid in said cooler under conditions of operation where said liquid in said cooler is subject to dilution, comprising a feed pump between said cooler and said concentrator and feeding the dilute liquid from said cooler through said heat exchanger to said concentrator, a return pump arranged to return the concentrated liquid from said strong liquor receiver through said heat exchanger to said cooler, means responsive to the degree of dilution of said liquid in said cooler for substantially simultaneously rendering said feed and return pumps operative and inoperative, a three-way valve having its common inlet connected to the concentrated liquid outlet from said heat exchanger and in one position of its parts delivering the concentrated liquid from its inlet to the dilute liquid entering said heat exchanger and in another position of its parts delivering the concentrated liquid from its inlet to said cooler, means holding said three-way valve parts in said one position during the initial operation of said feed and return pumps, and means moving said three-way valve parts to said another position during the continued operation of said feed and return pumps.

6. In concentrating apparatus for a cooler having means for discharging liquid containing an antifreeze component having a boiling point higher than water, into direct contact with a gas, a tank collecting said discharged liquid and means recirculating said liquid from said tank to said discharging means, and said concentrating apparatus having a concentrator in which heat is applied to said liquid to evaporate a portion of the water therein and from which the concentrated liquid overflows, a strong liquor receiver collecting the concentrated liquid overflowing from said concentrator and a heat exchanger through which the liquid flowing to and from said concentrator passes in heat exchange relation; the combination therewith of means for maintaining the concentration of said liquid in said cooler under conditions of operation where said liquid in said cooler is subject to dilution, comprising a feed pump between said cooler and said concentrator and feeding the dilute liquid from said cooler through said heat exchanger to said concentrator, a return pump arranged to return the concentrated liquid from said strong liquor receiver through said heat exchanger to said cooler, means responsive to the degree of dilution of said liquid in said cooler for substantially simultaneously rendering said feed and return pumps operative and inoperative, a three-way valve having its common inlet connected to the concentrated liquid outlet from said heat exchanger and in one position of its parts delivering the concentrated liquid from its inlet to the dilute liquid entering said heat exchanger and in another position of its parts delivering the concentrated liquid from its inlet to said cooler, means normally holding said three-way valve parts in said one position, and means responsive to a rising level of the concentrated liquid in said strong liquor receiver and moving said three-way valve parts to said another position.

7. In concentrating apparatus for a cooler having means for discharging liquid containing an antifreeze component having a boiling point higher than water, into direct contact with a gas, a tank collecting said discharged liquid and means recirculating said liquid from said tank to said discharging means, and said concentrating apparatus having a concentrator in which heat is applied to said liquid to evaporate a portion of the water therein and from which the concentrated liquid overflows, a strong liquor receiver collecting the concentrated liquid overflowing from said concentrator and a heat exchanger through which the liquid flowing to and from said concentrator passes in heat exchange relation; the combination therewith of means for maintaining the concentration of said liquid in said cooler under conditions of operation where said liquid in said cooler is subject to dilution, comprising a feed pump between said cooler and said concentrator and feeding the dilute liquid from said cooler through said heat exchanger to said concentrator, a return pump arranged to return the concentrated liquid from said strong liquor receiver through said heat exchanger to said cooler, means responsive to the degree of dilution of said liquid in said cooler for substantially simultaneously rendering said feed and return pumps operative and inoperative, a three-way valve having its common inlet connected to the concentrated liquid outlet from said heat exchanger and in one position of its parts delivering the concentrated liquid from its inlet to the dilute liquid entering said heat exchanger and in another position of its parts delivering the concentrated liquid from its inlet to said cooler, means normally holding said three-way valve parts in said one position, means responsive to a rising level of the concentrated liquid in said strong liquor receiver and moving said three-way valve parts to said another position, and a check valve in each line through said heat exchanger and preventing reverse flow of the dilute and concentrated liquid therethrough.

8. In concentrating apparatus for a cooler having means for discharging liquid containing an antifreeze component having a boiling point higher than water, into direct contact with a gas, a tank collecting said discharged liquid and means recirculating said liquid from said tank to said discharging means, and said concentrating apparatus having a concentrator in which heat is applied to said liquid to evaporate a portion of the water therein and from which the concentrated liquid overflows, a strong liquor receiver collecting the concentrated liquid overflowing from said concentrator and a heat exchanger through which the dilute liquid flowing from said cooler to said concentrator passes in heat exchange relation with the concentrated liquid flowing from said strong liquor receiver to said cooler; the combination therewith of means for maintaining the concentration of said liquid in said cooler under conditions of operation where said liquid in said cooler is subject to dilution, comprising a feed pump between said cooler and said heat exchanger and feeding the dilute liquid from said cooler through said heat exchanger to said concentrator, a return pump between said strong liquor receiver and said heat exchanger for returning the concentrated liquid from said strong liquor receiver through said heat exchanger to said cooler, means responsive to the degree of dilution of said liquid in said cooler for substantially simultaneously rendering said feed and return pumps operative and inoperative, a three-way valve having its common inlet connected to the concentrated liquid outlet from said heat exchanger and in one position of its parts delivering the concentrated liquid from its inlet to the dilute liquid entering said heat exchanger and in another position of its parts delivering the concentrated liquid from its inlet to said cooler, means normally holding said three-way valve parts in said one position, and means responsive to a rising level of the concentrated liquid in said strong liquor receiver and moving said three-way valve parts to said another position.

WALTER KALS.

REFERENCES CITED

The following references are of record in the file of this patent:

UNITED STATES PATENTS

| Number | Name | Date |
| --- | --- | --- |
| 1,721,760 | Zeitler | July 23, 1929 |
| 1,841,812 | Hlatky | Jan. 19, 1932 |
| 2,199,967 | Bichowsky | May 7, 1940 |
| 2,235,004 | Ashby | Mar. 18, 1941 |
| 2,286,618 | Hiller, Jr. | June 16, 1942 |
| 2,324,193 | Brunel | July 13, 1943 |
| 2,352,655 | Olstad | July 4, 1944 |